(12) United States Patent
Buryak et al.

(10) Patent No.: US 8,977,620 B1
(45) Date of Patent: Mar. 10, 2015

(54) METHOD AND SYSTEM FOR DOCUMENT CLASSIFICATION

(75) Inventors: Kirill Buryak, Sunnyvale, CA (US); Aner Ben-Artzi, Los Angeles, CA (US); Glenn M. Lewis, Costa Mesa, CA (US); Jun Peng, San Ramon, CA (US)

(73) Assignee: Google Inc., Mountain View, CA (US)

( * ) Notice: Subject to any disclaimer, the term of this patent is extended or adjusted under 35 U.S.C. 154(b) by 244 days.

(21) Appl. No.: 13/531,049

(22) Filed: Jun. 22, 2012

Related U.S. Application Data

(60) Provisional application No. 61/580,503, filed on Dec. 27, 2011, provisional application No. 61/594,574, filed on Feb. 3, 2012.

(51) Int. Cl.
*G06F 17/30* (2006.01)

(52) U.S. Cl.
CPC ...... *G06F 17/30707* (2013.01); *G06F 17/3071* (2013.01)
USPC ............ 707/737; 707/749; 707/752; 707/758

(58) Field of Classification Search
CPC .......... G06F 17/30707; G06F 17/2785; G06F 17/30705; G06F 17/3071; G06F 2216/03; G06F 17/27; G06F 17/2745; G06Q 10/10; G06Q 30/02; G06Q 30/016; G06Q 10/06; G06Q 10/0631; G06Q 30/0201; G06Q 30/0203; G06Q 30/0282; G06Q 50/01
USPC ......... 707/737, 705, 707, 710, 723, 731, 736, 707/738, 740, 741, 748, 755, 771, 749, 752, 707/758
See application file for complete search history.

(56) References Cited

U.S. PATENT DOCUMENTS

| | | | |
|---|---|---|---|
| 6,751,614 B1 | 6/2004 | Rao | |
| 6,904,420 B2 | 6/2005 | Shetty et al. | |
| 7,158,986 B1 | 1/2007 | Oliver et al. | |
| 7,225,183 B2 | 5/2007 | Gardner | |
| 7,386,560 B2 | 6/2008 | Tan | |
| 7,496,567 B1 | 2/2009 | Steichen | |
| 7,584,100 B2 | 9/2009 | Zhang et al. | |
| 7,593,904 B1 | 9/2009 | Kirshenbaum et al. | |
| 7,668,789 B1 * | 2/2010 | Forman et al. | 706/20 |
| 7,788,087 B2 * | 8/2010 | Corston-Oliver et al. | 704/9 |
| 7,930,282 B2 * | 4/2011 | Spangler | 707/705 |
| 7,937,345 B2 | 5/2011 | Schmidtler et al. | |
| 7,958,067 B2 | 6/2011 | Schmidtler et al. | |
| 7,971,150 B2 * | 6/2011 | Raskutti et al. | 715/764 |
| 8,090,717 B1 | 1/2012 | Bharat et al. | |
| 8,244,724 B2 * | 8/2012 | Chen et al. | 707/727 |
| 8,473,624 B2 * | 6/2013 | Mart et al. | 709/228 |
| 8,671,098 B2 * | 3/2014 | Salvetti et al. | 707/738 |

(Continued)

*Primary Examiner* — Jay Morrison
*Assistant Examiner* — Dangelino Gortayo
(74) *Attorney, Agent, or Firm* — Armstrong Teasdale LLP

(57) ABSTRACT

A method and system of classifying documents is provided. The method includes receiving a plurality of documents from at least one user, wherein each document includes information relating to a customer support issue or sentiment and identifying at least one customer support issue or sentiment contained within each document. The method also includes classifying the documents satisfying a confidence threshold using a classifier, clustering the remainder of the plurality of documents into groups using a clustering engine, the clustering engine applying a word analysis, and outputting a frequency of each identified customer support issue or sentiment, the frequency based on the classifying or the clustering.

20 Claims, 4 Drawing Sheets

(56) References Cited

U.S. PATENT DOCUMENTS

| | | | |
|---|---|---|---|
| 8,805,843 B2* | 8/2014 | Chen et al. | 707/738 |
| 8,838,438 B2* | 9/2014 | Leary et al. | 704/9 |
| 2003/0088565 A1 | 5/2003 | Walter et al. | |
| 2003/0130993 A1 | 7/2003 | Mendelevitch et al. | |
| 2006/0095521 A1 | 5/2006 | Patinkin | |
| 2006/0155575 A1 | 7/2006 | Gross | |
| 2007/0027830 A1 | 2/2007 | Simons et al. | |
| 2010/0017487 A1 | 1/2010 | Patinkin | |
| 2010/0063948 A1 | 3/2010 | Virkar et al. | |
| 2010/0122212 A1 | 5/2010 | Boudalier | |
| 2010/0223276 A1 | 9/2010 | Al-Shameri et al. | |
| 2011/0145178 A1 | 6/2011 | Schmidtler et al. | |
| 2011/0196870 A1* | 8/2011 | Schmidtler et al. | 707/737 |
| 2011/0264651 A1 | 10/2011 | Selvaraj et al. | |
| 2011/0270770 A1* | 11/2011 | Cunningham et al. | 705/304 |
| 2012/0078969 A1 | 3/2012 | Ananthanarayanan et al. | |
| 2012/0084235 A1 | 4/2012 | Suzuki et al. | |
| 2013/0117267 A1 | 5/2013 | Buryak et al. | |

* cited by examiner

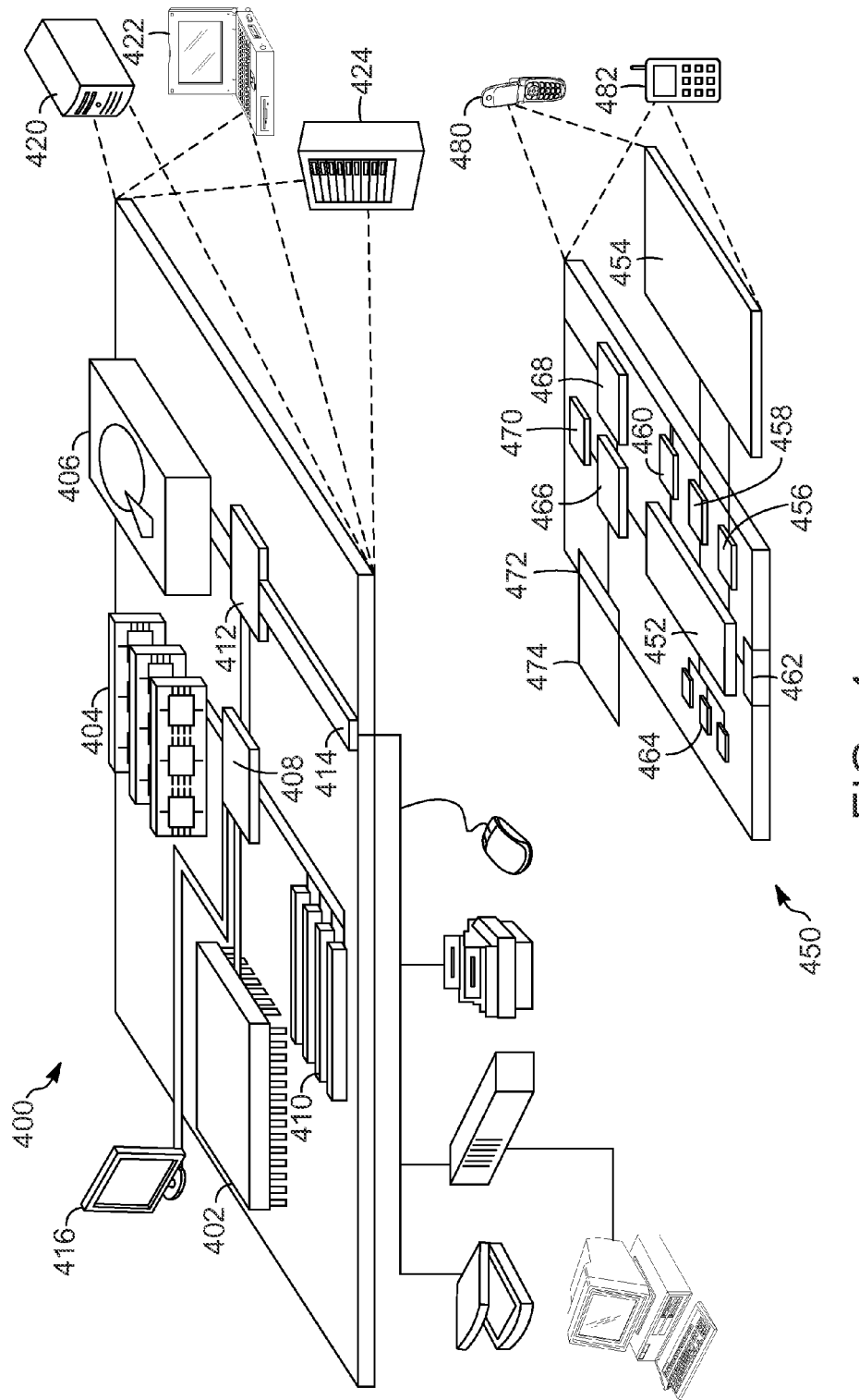

METHOD AND SYSTEM FOR DOCUMENT CLASSIFICATION

CROSS REFERENCE TO RELATED APPLICATIONS

This application claims priority to provisional patent application Ser. No. 61/580,503 filed on Dec. 27, 2011, and provisional patent application Ser. No. 61/594,574 filed on Feb. 3, 2012, which are both hereby incorporated by reference in their entirety.

BACKGROUND OF THE INVENTION

The field of the invention relates generally to information management, and more specifically, to methods and systems for classification of inbound communications to an organization or entity.

Organizations and businesses can receive a large number of messages from customers, potential customers, users and/or other people. For example, a business and/or organization can receive messages from its customers and potential customers, such as email messages, messages from online forums, e.g., support forums or message boards, and other types of messages. These messages can be related to a variety of different topics or issues. For example, the messages can be related to problems experienced by a user and can include a request for assistance to solve the problem. Oftentimes, these request messages are directed to a support center at the organization/business.

In addition, the Internet provides these organizations and businesses with access to a wide variety of resources, including web pages for particular topics, reviews of products and/or services, news articles, editorials and blogs. The authors of these resources can express their opinions and/or views related to a myriad of topics such a product and/or service, politics, political candidates, fashion, design, etc. For example, an author can create a blog entry supporting a political candidate and express their praise in the candidate's position regarding fiscal matters or social issues. As another example, authors can create a restaurant review on a blog or on an online review website and provide their opinions of the restaurant using a numerical rating (e.g., three out of five stars), a letter grade (e.g., A+) and/or a description of their dining experience to indicate their satisfaction with the restaurant.

Such a large volume of documents (i.e., different types of electronic documents including text files, e-mails, images, metadata files, audio files, presentations, etc.) can be very difficult for organizations and/or businesses to manage. Entities may try to use clustering techniques to manage such a large volume of documents. Various algorithms can be used on a corpus of documents to produce different clusters of documents such that the documents within a given cluster share a common characteristic. These known clustering algorithms can be very time consuming to implement, and oftentimes provide poor results such as clusters having many unrelated documents.

BRIEF DESCRIPTION OF THE INVENTION

In one embodiment, a computer-implemented method of classifying documents including executing instructions stored on a computer-readable medium includes receiving a plurality of documents from at least one user, wherein each document includes information relating to a customer support issue or sentiment and identifying at least one customer support issue or sentiment contained within each document. The method also includes classifying the documents satisfying a confidence threshold using a classifier, clustering the remainder of the plurality of documents into groups using a clustering engine, the clustering engine applying a word analysis, and outputting a frequency of each identified customer support issue or sentiment, the frequency based on the classifying or the clustering.

In another embodiment, a computer system includes a classifier configured to determine if a document refers to a predetermined issue and if a confidence level of the determination meets a confidence level threshold, associate a probability to the document that the document refers to the issue. The system further includes a clustering module configured to receive the reminder documents that do not meet the confidence level threshold and cluster the remainder documents into groups containing similar terms relating to an issue. The system also includes an output module configured to generate a report of a frequency of occurrence of documents associated with an issue.

BRIEF DESCRIPTION OF THE DRAWINGS

FIGS. 1-4 show exemplary embodiments of the method and apparatus described herein.

FIG. 1 is a diagram of an example environment for grouping documents from a document corpus;

FIG. 2 is a data flow diagram of environment 100 in accordance with another embodiment of the present invention;

FIG. 3 is a flow chart of a computer-implemented method of classifying documents; and FIG. 4 is a block diagram showing example or representative computing devices and associated elements that may be used to implement the systems of FIGS. 1 and 2.

DETAILED DESCRIPTION OF THE INVENTION

Figure 1:
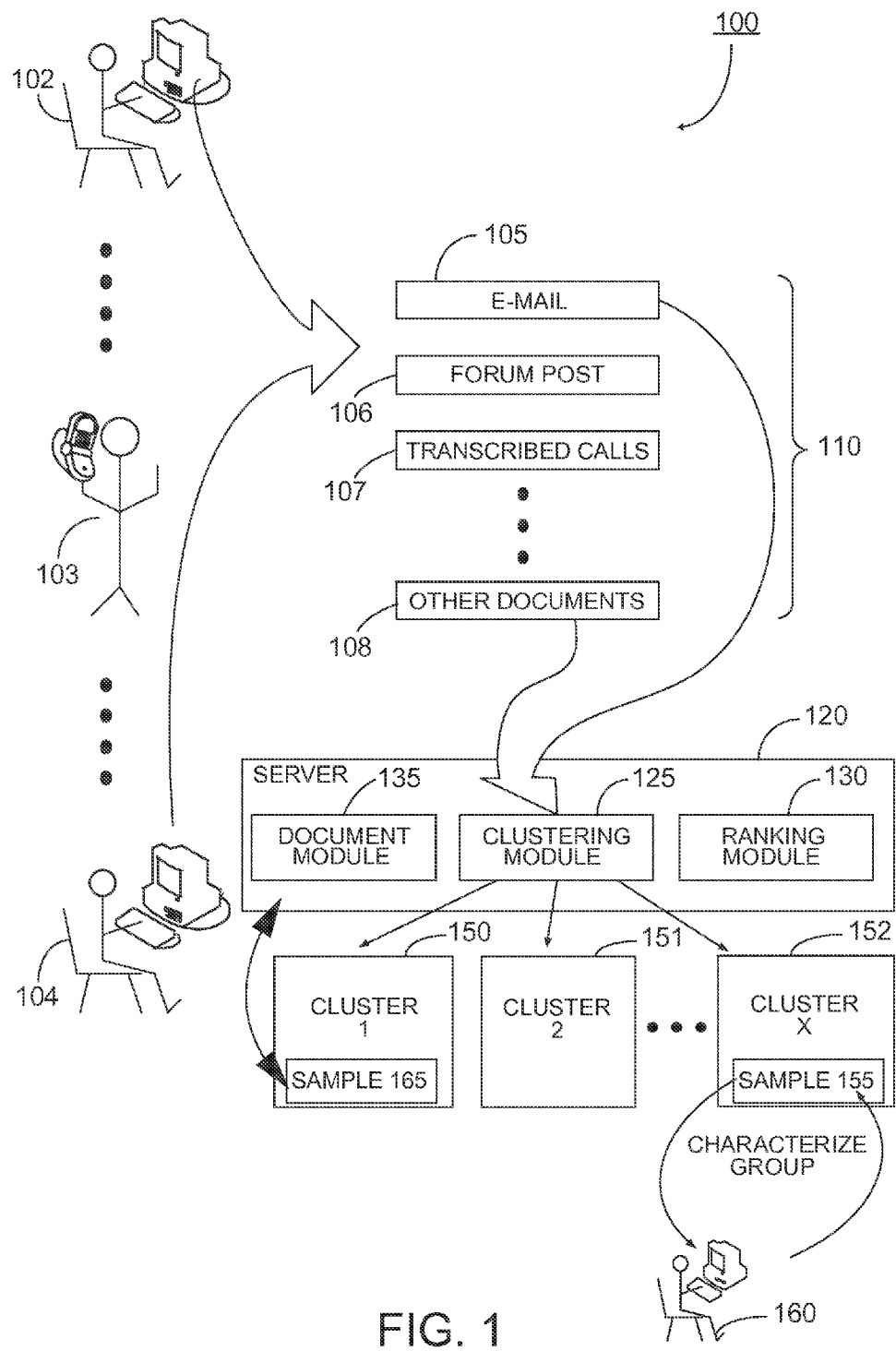

The following detailed description illustrates embodiments of the invention by way of example and not by way of limitation. It is contemplated that the invention has general application to analytical and methodical embodiments of classifying a corpus of documents according to a topic or sentiment contained in those documents in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The present disclosure describes methods and systems for information management, including management and classification of inbound communications to an organization or entity using one or more classifiers and a clustering algorithm processed in series on a document corpus. The one or more classifiers are configured to identify a topic of the documents in the corpus. If a confidence level of the identification does not meet a predetermined threshold, the document is transmitted to a clustering algorithm that clusters the documents that do not meet the threshold into groups of similar characteristics related by topic or sentiment. Each classifier has an associated topic and is configured to output a probability that the document is associated with the topic. The clustering algorithm may be further configured to automatically label the groups of documents.

The system can receive a document (e.g., an email or support request form) from a user and use one or more classifiers to identify a topic associated with the document. Identifying the topic also includes selecting the topic based on the probabilities provided by the classifiers.

Labeling a cluster based on a common characteristic shared by the documents in the cluster may be accomplished either manually or automatically to facilitate identifying issues or sentiment relating to a business entity. The document corpus can be augmented with some pre-labeled documents (possibly having various labels) before the clustering algorithm is executed. Several pre-labeled documents can end up in a given cluster upon the execution of the clustering algorithm. The label with the most number of occurrences in a given cluster can be selected as a label for the given cluster. Described herein are metrics that facilitate an automatic determination of whether the selected label can be applied to the given cluster (or documents therein).

A label can identify various types of information such as a subject or theme of a given cluster and therefore facilitate classification. Document clusters may be labeled by manual inspection where a subject matter expert retrieves samples from different clusters and labels the clusters based on information from the samples. Alternatively, or in addition, the system may be configured to automatically determine a label for each created cluster.

A corpus of documents can be separated into various clusters. A cluster can be a combination of documents in which all of the documents share one or more characteristics based on one or more common characteristics. In some implementations, the clusters produced from a corpus are labeled with an identifier that identifies the commonly shared characteristic of the documents that are members of the cluster. For example, if a corpus includes electronic mails (e-mails) from users to a customer support department of a computer manufacturer, such e-mails can be clustered into various clusters depending on, for example, the type of complaints or comments that the e-mails pertain to. In such cases, the clusters may be assigned labels or identifiers such as "hardware comments," "software complaints," and "firmware" to facilitate ease of further processing. For example, once the user e-mails are grouped and labeled into the abovementioned clusters, the emails can be distributed to suitable personnel for further handling.

FIG. 1 is a diagram of an example environment 100 for grouping documents from a document corpus 110. In the environment 100, users of a product (illustrated as users 102, 103 and 104) provide information, such as complaints, comments relating to the product, etc. that forms at least a portion of the document corpus 110. Although only three users are depicted, any number of users may provide the information. The number of users may even reach into the hundreds, thousands, tens of thousands, or more. The product can be considered as any type of goods or service. For example, the product can be, but is not limited to, an e-mail service, an advertising service, an Internet Protocol (IP) telephone service, a computer operating system, an electronic device such a computer or smartphone, or an automobile. The information can be provided, for example, in customer-related meetings such as customer support sessions.

In some implementations, the user-provided information can include feedback about the product's performance including, but not limited to, general complaints about the product, issues relating to specific features or operation of the product, and positive comments about the product. The feedback may include statements such as "my laptop would not boot," "my wireless keyboard does not seem to work," "I can't access my advertising account," and "color prints from my printer are getting smudged." Even though the environment 100 relates to customer service or support scenario, it should be noted that the present disclosure applies to various other environments in which documents are grouped into clusters. For example, the methods and systems described can be applied/used to cluster patents or technical literature based on different technologies, or to cluster a collection of movie reviews based on genres.

In some implementations, the documents in the corpus 110 can vary according to the environment or application. For example, in the customer support environment 100 depicted in FIG. 1, the corpus 110 includes documents related to feedback from the users 102-104 through any appropriate mechanisms, including telephones and computers. The information may include documents such as e-mail messages 105, posts to discussion forums 106, transcriptions of telephone calls 107, and any other document 108 that conveys feedback information, including, for example, records of chat sessions. Other documents 108 may also include data scraped from Internet sites and documents subscribed to from third party aggregators and data providers. The corpus 110 is provided to a server 120, which can include a clustering module 125 and a ranking module 130. Clustering module 125 may execute a clustering algorithm to group together documents from the corpus 110 that are similar to each other in some sense. In some implementations, the clustering module 125 can be a part of a clustering engine that resides on the server 120.

In some implementations, clustering can include grouping documents based on some information that is common to the documents. For example, the clustering module 125 can identify information, such as words, phrases, or other textual elements that are common to two or more documents of the corpus. In some implementations, the words are not predefined, but rather are identified based simply on their presence in the documents. Such information, that is not predefined but extracted based on parsing the documents, may be referred to as unplanned information. The clustering module 125 can define clusters corresponding to such unplanned information (e.g., words), and associate documents with corresponding clusters. For example, the clustering module 125 may identify one or more words or phrases, such as "inbox" and "capacity" that are common to at least some of the documents. In such cases, since unplanned terms are used to define clusters, the clustering module 125 can define clusters that might not have been predicted and, therefore, might not otherwise have been identified.

In the above example, the clustering module 125 may define a cluster that contains documents (or references to documents) having both the words "inbox" and "capacity" in their text. Another cluster may include documents having both the words "drop" and "call," and so on. In some implementations, one or more rules can specify, e.g., what words may be used for clustering, the frequency of such words, and the like. For example, the clustering module can be configured to group together documents where a given word or synonyms of the given word are present more than five times. In another example, the clustering module 125 can be configured to group together documents where any of a predefined set of words is present at least once.

In some implementations, one or more sets of pre-labeled documents can be added to the document corpus 110 to create an augmented corpus. For clustering purposes, the labels of the pre-labeled documents can be ignored. Once a clustering algorithm is executed on the augmented corpus, the pre-labeled documents can be tracked to determine their distribution in the various resultant clusters. Further, such tracking may be used to facilitate automatic labeling of the resultant clusters. For example, if the augmented corpus includes pre-labeled documents labeled "A", "B" or "C" and a particular resultant cluster includes 80% of the pre-labeled documents labeled "A" but only 30% of the pre-labeled documents labeled "B", a probability that other documents within the cluster are related to subject matter identified by the label "A" can be higher than a probability that such documents are related to subject matter identified by label "B". Therefore, the cluster (or documents within the cluster) could be labeled "A" with a high degree of confidence. In some implementations, one or more metrics could be defined to assist in the determining if and/or how a particular cluster can be labeled, e.g., based on the distribution of pre-labeled documents within the clusters.

In some implementations, the clustering module 125 produces document clusters 150, 151, 152. Although only three clusters are shown, any number (e.g., one or more) of clusters may be produced. In unsupervised clustering, the significance of a given cluster (e.g. what the cluster represents) is generally unknown. Accordingly, each cluster may need to be labeled. Labeling a cluster with a label can include assigning the label to each document within the cluster. The labeling process may be automatic or manual. For example, a sample 155 may be chosen (e.g. pseudo randomly) from the cluster 152 and read by an operator 160 to identify the subject matter of the sample 155. The cluster 152 may be characterized based on the subject matter identified for one sample (e.g., sample 155) or multiple samples. For example, in a cluster where the words "inbox" and "capacity" occur frequently in the documents, one or more samples can be analyzed to identify that the subject matter generally pertains to complaints on e-mail inbox capacity. In such cases, the cluster can be labeled accordingly (e.g., with a label: "problems with email inbox capacity").

In some implementations, a cluster (e.g. cluster 150) can be labeled by automatically analyzing one or more samples (e.g. a sample 165) from the cluster 150. In such cases, the automatic analysis of the sample can be performed on a computing device, such as the server 120 or other type of computing device. In some implementations, the server 120 can include a labeling engine (not shown) that facilitates operations to automatically label document clusters. In some implementations, where the document corpus 110 is augmented by pre-labeled documents, a cluster can be automatically labeled based on determining a distribution of the pre-labeled documents contained in the cluster. For example, a cluster can be automatically labeled based on the number of pre-labeled documents with a given label that end up in the cluster. In some implementations, a cluster can be automatically labeled based on a relative proportion of a given label to the total number of pre-labeled documents. Such a determination, and hence the automatic labeling on the cluster can be facilitated by the labeling engine. Examples of such automatic labeling are described below with reference to FIG. 2. The labeling engine can reside or execute on a computing device such as the server 120. In some implementations, the labeling of the clusters can be facilitated using a combination of automatic and manual methods. For example, if an automatic method fails to unambiguously determine a label for a particular cluster, the cluster may be delegated for further processing by an individual such as the operator 160.

In some implementations, the server 120 can also include a document module 135 for processing the corpus 110. For example, in a customer support environment, the document module 135 may retrieve different types of communications from various users, locations, and format and process the communications such that they share a common document (e.g., textual) format. The communications may be retrieved from a voicemail server (e.g., transcribed telephone calls), from a forum server (e.g., forum posts), from an e-mail server (e.g., e-mails), or from other sources (e.g., servers or other devices) not described here. Retrieval may include requesting and receiving communications relating to a product or service from the various sources and/or performing a direct memory access of storage locations in the various sources for the communications. In some implementations, each source can maintain one or more databases or the like, that stores the various communications, and each source can perform keyword searches of their databases, e.g., to identify communications relating to particular products, services or other items. In some implementations, a communication can be parsed to identify the communication.

The document module 135 may format the documents that it receives so that the resulting documents have a common format. For example, tags or other identifiers, if present, may be removed from the retrieved documents or otherwise modified. Other types of formatting may also be performed, e.g., to remove or modify any formatting codes, headers or other such information.

In some implementations, the document clusters may be ranked using the ranking module 130, which may also be executed on the server 120. In some implementations, the ranking module 130 ranks document clusters according to one or more metrics. For example, the ranking module 130 may rank the clusters 150, 151 and 152 according to an estimated time to resolution of an issue represented by the cluster (e.g., issues represented by a cluster "software update" may typically be resolved faster than issues represented by a cluster "hardware malfunction"), a label assigned to the cluster, a number of documents in a cluster, a designated importance of subject matter associated with a cluster, identities of authors of documents in a cluster, or a number of people who viewed documents in a cluster, etc. In an example, a cluster representing an issue that historically has taken a longer time to resolve may be ranked higher than a cluster representing an issue with a shorter historical time to resolution. In another example, several metrics are weighted and factored to rank the clusters. The ranking module 130 can be configured to output the rankings to a storage device (e.g., in the form of a list or other construct).

The information obtained by grouping documents into clusters and labeling the clusters may be used to identify problem(s) or other issues with a product or service and to provide appropriate resolution paths. For instance, in response to identifying a cluster (with a label) as "problems with e-mail inbox capacity," a person or department responsible for maintenance of e-mail systems can be contacted to resolve the problem. The resolution could involve instructing the person or department to increase the capacity of e-mail inboxes, or to provide users with an option to increase the inbox capacity (e.g., for an additional fee). The rankings provided by the ranking module 130 may indicate level(s) of importance to the document clusters. The topic(s) (e.g., problems or other issues), identified by the labels assigned to the document clusters, may be addressed in order of importance. For example, if the cluster having "problems with e-mail inbox capacity" is ranked highest among the clusters (and, thus, most important), issues with email capacity may be addressed first, followed by other topics in order of importance.

Figure 2:
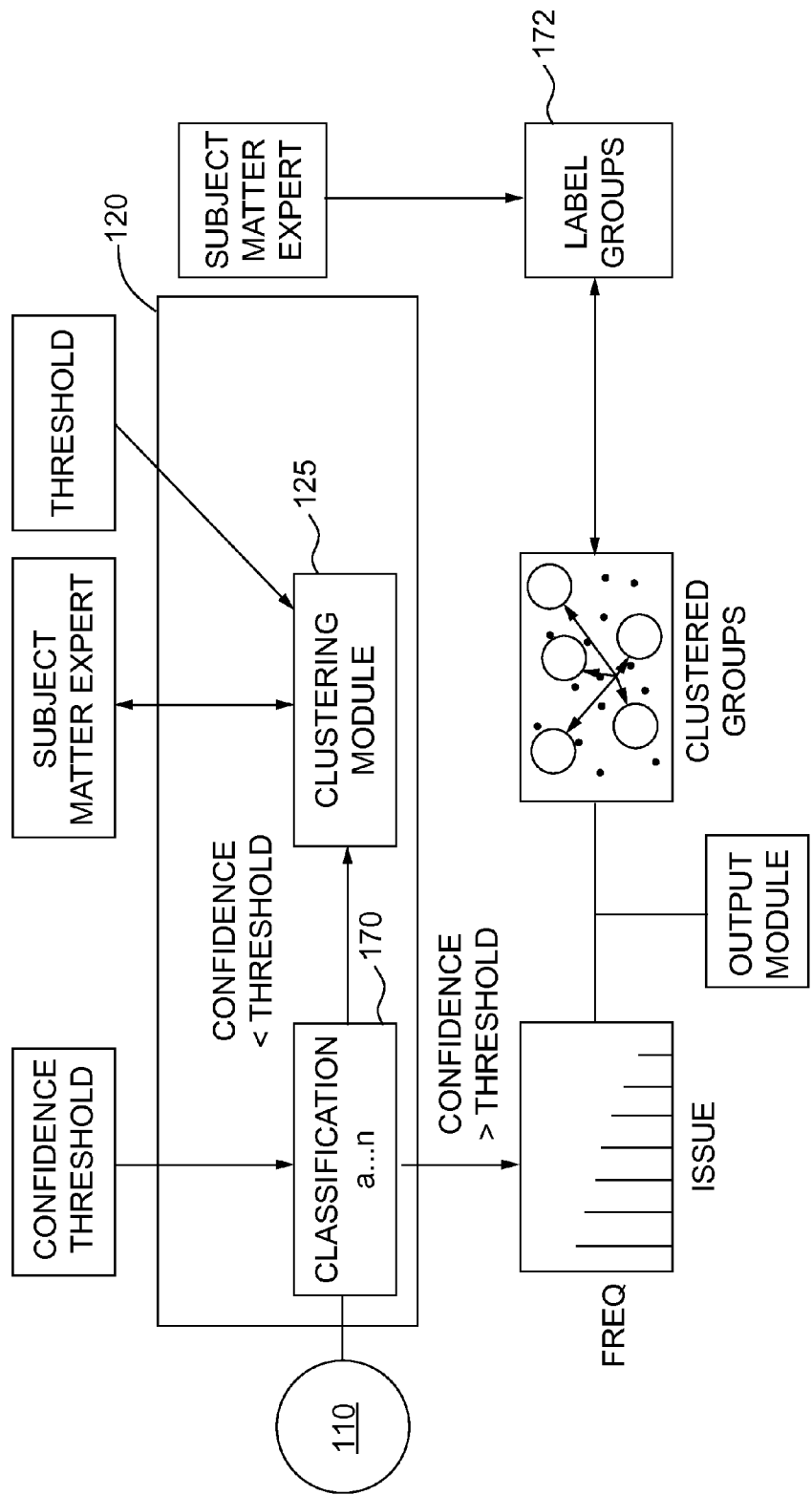

FIG. 2 is a data flow diagram of environment 100 in accordance with another embodiment of the present invention. In the exemplary embodiment, server 120 includes one or more classifiers 170. Each classifier 170 can be configured to identify a particular issue or topic. For example, the classifier 170a can be configured to identify login problems, the classifier 170b can be configured to identify billing problems and the classifier 170n can be configured to identify lost data issues. Each classifier 170 can apply a generalized expectation criteria (GE) classification algorithm to identify a particular issue or topic. In some implementations, the GE classification algorithm relies on a maximum entropy algorithm to optimize the classification model based on constraints associated with the training data. Each classifier 170 can analyze the documents from corpus 110 and provide a probability that the topic included in the document is the same as or similar to the topic or topics associated with a particular instance of classifier 170. For example, classifier 170a, which is configured to identify login problems, can analyze the documents of corpus 110 and determine the probability that the topic associated with the user document is related to login problems.

The probability that a document relates to a specific topics or issue may be compared to a threshold. The threshold provides a confidence level that the one or more classifiers were able to properly classify the document based on the predetermined topics or issues. Documents whose associated probability is below the threshold may not include sufficient information on one of the predetermined topics of classifiers 170. In such a case the document is passed to clustering module 125, where groups of documents that refer to similar topics may be grouped based on their similarity as described above.

In some embodiments, multiple topics are associated with the one document. For example, if classifier 170 determines that a plurality of topics associated with a document all have probability values greater than the predetermined threshold value (e.g., 60%, 70%, etc.). For example, if the predetermined threshold is 70% and two classifiers 170a and 170b output probability values equal to 80%, then the document can be classified in two classifiers 170a and 170b and are each associated with the document.

A labeling module 172 is configured to associate at least one document cluster of the plurality of document clusters with a predicted cluster label that is representative of the subset of documents included within the at least one document cluster. A modeling module is configured to calculate a plurality of metric values associated with an accuracy of the predicted cluster label. The modeling module is configured to generate a classification model based on the plurality of metric values. In an alternative embodiment, labeling module receives manual labeling commands from a subject matter expert. The subject matter expert reviews samples of groups of clustered documents and generates commands that define the content of the documents being assigned to the plurality of groups.

Figure 3:
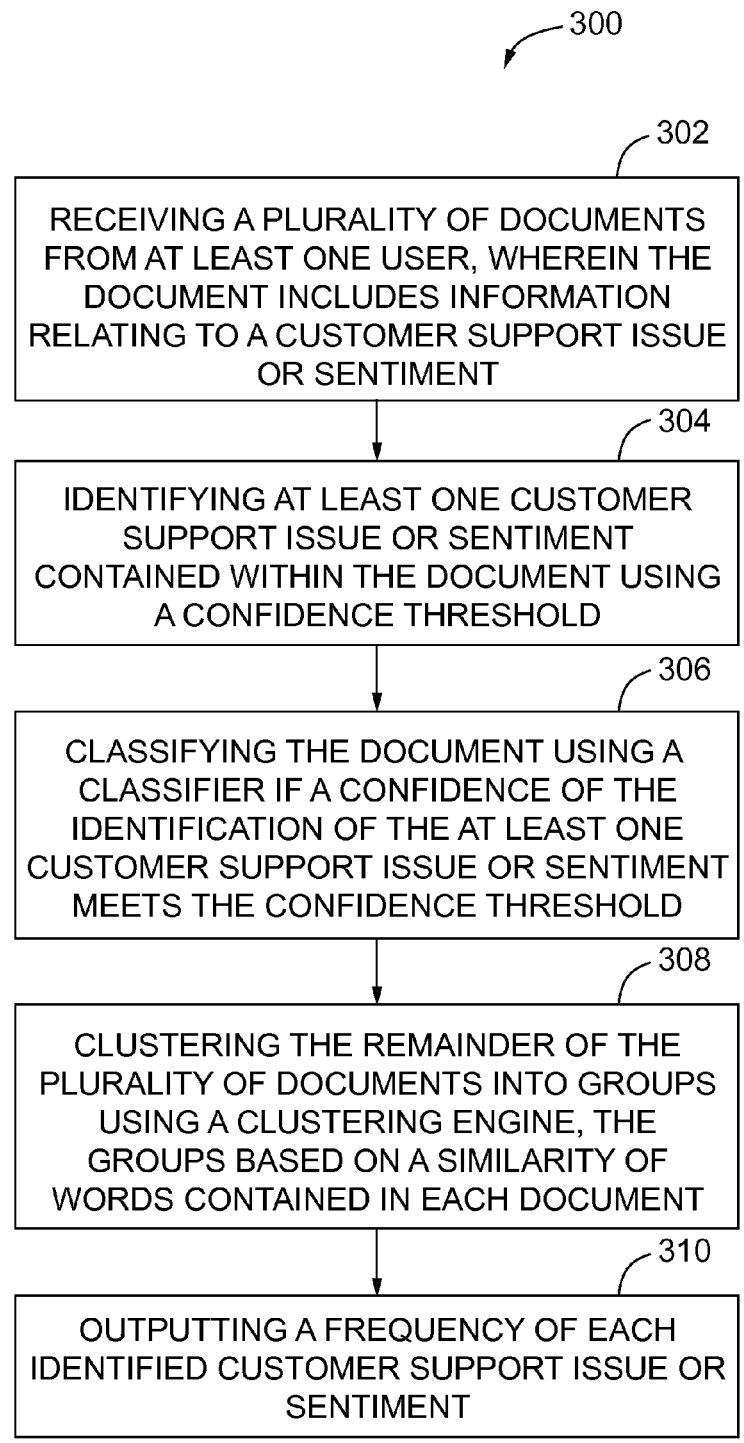

FIG. 3 is a flow chart of a computer-implemented method 300 of classifying documents. In the exemplary embodiment, method 300 includes receiving 302 a plurality of documents from at least one user, wherein each document includes information relating to a customer support issue or sentiment and identifying 304 at least one customer support issue or sentiment contained within each document. Method 300 further includes classifying 306 the documents satisfying a confidence threshold using a classifier, clustering 308 the remainder of the plurality of documents into groups using a clustering engine, the clustering engine applying a word analysis, and outputting 310 a frequency of each identified customer support issue or sentiment, the frequency based on the classifying or the clustering.

FIG. 4 is a block diagram showing example or representative computing devices and associated elements that may be used to implement the systems of FIGS. 1 and 2. FIG. 4 illustrates an exemplary generic computing device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low speed controller 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-bus 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, which may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning system) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, a computer tablet, or other similar mobile device.

As will be appreciated based on the foregoing specification, the above-described embodiments of the disclosure may be implemented using computer programming or engineering techniques including computer software, firmware, hardware or any combination or subset thereof, wherein the technical effect is for an incremental porting of high level language code to the target processor code such that only a certain portion of the high level language code is ported to the target processor and the remaining code remains intact on the host computer. A system verification is performed by executing the ported code in the target processor while executing the remaining code on the host computer. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 400 and/or 450) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 400 and 450 are configured to receive and/or retrieve electronic documents from various other computing devices connected to computing devices 400 and 450 through a communication network, and store these electronic documents within at least one of memory 404, storage device 406, and memory 464. Computing devices 400 and 450 are further configured to manage and organize these electronic documents within at least one of memory 404, storage device 406, and memory 464 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method of classifying documents including executing instructions stored on a computer-readable medium, said method comprising:
   receiving a plurality of documents from at least one user, wherein each document includes at least one of unplanned information relating to a customer support issue and an indication of a sentiment;
   identifying at least one customer support issue or sentiment contained within each document by parsing the plurality of documents;
   classifying, using a classifier, at least a portion of the plurality of documents that satisfy a confidence threshold into one of a plurality of classes, each class associated with the identified at least one customer support issue or sentiment;
   clustering a remainder of the plurality of documents that do not satisfy the confidence threshold for the identified at least one customer support issue or sentiment into a plurality of clustered groups using a clustering engine, the clustering engine applying a word analysis; and
   outputting a frequency of each identified customer support issue or sentiment in each of the classes and clustered groups, the frequency based on said classifying or said clustering.

2. A method in accordance with claim 1, wherein the plurality of documents includes one or more of electronic mail documents, forum post documents, telephone call transcript documents and chat session record documents.

3. A method in accordance with claim 1, further comprising labeling each group of the plurality of clustered groups based on a probability that the group relates to a determined customer support issue or sentiment.

4. A method in accordance with claim 1, wherein clustering the documents into the plurality document groups further comprises identifying documents from the combined set of documents in which a frequency of appearance of a particular word or phrase exceeds a predetermined occurrence threshold.

5. A method in accordance with claim 1, further comprising automatically labeling each group of the plurality of clustered groups by a label module.

6. A method in accordance with claim 1, further comprising manually labeling each group of the plurality of clustered groups by a subject matter expert.

7. A method in accordance with claim 1, further comprising receiving by the clustering engine all documents that do not meet the confidence threshold.

8. A method in accordance with claim 1, wherein outputting a frequency of each identified customer support issue or sentiment comprises generating a hybrid report that includes a frequency of occurrence of issues in the documents that were classified by the classifier and includes a frequency of occurrence of issues that were grouped by the clustering engine.

9. A computer system for processing documents, said computer system comprising:
   a memory device;
   a processor in communication with the memory device;
   a classifier configured to:
   receive a plurality of documents, each document includes unplanned information relating to a customer support issue or sentiment;
   determine if a document of the plurality of documents refers to a customer support issue or sentiment by parsing the plurality of documents; and
   if a confidence level of the determination meets a confidence level threshold of the customer support issue or sentiment, associate a probability to the document that the document refers to the customer support issue or sentiment; and
   a clustering module configured to
   receive a remainder of the plurality of documents that do not meet the confidence level threshold of the customer support issue or sentiment; and
   cluster the remainder of the plurality of documents that do not satisfy the confidence threshold for the customer support issue or sentiment into a plurality of clustered groups containing similar terms relating to the customer support issue or sentiment; and
   an output module configured to generate a report of a frequency of occurrence of documents associated with the customer support issue or sentiment.

10. A system in accordance with claim 9, wherein said classifier is configured to receive a plurality of documents containing text referring to a customer support issue.

11. A system in accordance with claim 9, wherein said classifier is configured to receive the confidence level threshold determined from a set of classification training documents, said classification training documents comprising documents having a predetermined confidence level.

12. A system in accordance with claim 9, wherein said classifier is configured to receive the confidence level threshold entered by a user.

13. A system in accordance with claim 9, wherein said output module is configured to generate a hybrid report that includes a frequency of occurrence of issues in the documents that were classified by the classifier and includes a frequency of occurrence of issues that were grouped by the clustering module.

14. One or more non-transitory computer-readable storage media having computer-executable instructions embodied thereon, wherein when executed by at least one processor, the computer-executable instructions cause the processor to:
   receive a plurality of documents from at least one user, wherein each document includes unplanned information relating to a customer support issue or sentiment;
   identify at least one customer support issue or sentiment contained within each document by parsing the plurality of documents;
   if a confidence level of the identification meets a confidence level threshold of the customer support issue or sentiment, classify the documents satisfying a confidence threshold using a classifier into one of a plurality of classes, each class associated with the identified at least one customer support issue or sentiment;
   cluster a remainder of the plurality of documents that do not meet the confidence level threshold into a plurality of clustered groups containing similar terms relating to the customer support issue or sentiment using a clustering engine, the clustering engine applying a word analysis; and
   output a frequency of each identified customer support issue or sentiment within at least one of the plurality of classes and plurality of clustered groups, the frequency based on said classification or said clustering.

15. The computer-readable storage media of claim 14, wherein the computer-executable instructions further cause the processor to receive a plurality of documents including one or more of electronic mail documents, forum post documents, telephone call transcript documents and chat session record documents.

16. The computer-readable storage media of claim 14, wherein the computer-executable instructions further cause the processor to label each group of the plurality of clustered groups based on a probability that the group relates to a determined customer support issue or sentiment.

17. The computer-readable storage media of claim 14, wherein the computer-executable instructions further cause the processor to identify documents from the combined set of documents in which a frequency of appearance of a particular word or phrase exceeds a predetermined occurrence threshold.

18. The computer-readable storage media of claim 14, automatically label each group of the plurality of clustered groups by a label module.

19. The computer-readable storage media of claim 14, wherein the computer-executable instructions further cause the processor to receive a manual labeling of each group by a subject matter expert.

20. The computer-readable storage media of claim 14, wherein the computer-executable instructions further cause the processor to receive by the clustering engine all documents that do not meet the confidence threshold.

* * * * *